United States Patent Office 3,190,921
Patented June 22, 1965

3,190,921
N,N-SUBSTITUTED-AMINOETHYLENE-PHOSPHONIUM COMPOUNDS
Angelo John Speziale, Creve Coeur, and Lowell R. Smith, St. Louis, Mo., assignors to Monsanto Company, a corporation of Delaware
No Drawing. Filed Mar. 16, 1962, Ser. No. 180,326
14 Claims. (Cl. 260—577)

This invention relates to a new class of useful phosphorus compounds having herbicidal and other pesticidal activity. This new class of compounds has the structure

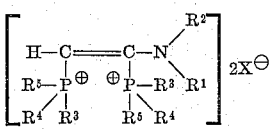

wherein X is a halogen of the class consisting of bromine and chlorine, and wherein $R^1$, $R^2$, $R^3$, $R^4$ and $R^5$ are each organic radicals of the group consisting of hydrocarbon radicals of the class consisting of alkyl radicals of up to 12 carbon atoms, such as methyl, ethyl, hexyl, octyl and dodecyl; alkenyl radicals of up to 12 carbon atoms, such as vinyl, allyl, butenyl, octenyl and decenyl; the alkynyl radicals of up to 12 carbon atoms, such as acetylenyl, hexynyl and dodecynyl; the cycloaliphatic radicals of five to seven carbon atoms, such as cyclohexyl, cyclohexenyl, cyclopentyl, cycloheptenyl and cyclohexynyl; phenyl, naphthyl; and the said hydrocarbons containing substituents selected from the class consisting of alkyl radicals having up to four carbon atoms, alkoxy radicals having up to four carbon atoms, nitro, cyano, phenyl, bromine and chlorine.

The new compounds are prepared by heating compounds of the structure

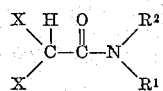

with a molar excess of a tertiary phosphine.

Useful amides for the preparation of the new phosphonium compounds include:

N-ethyl-N-butyl-2,2-dichloroacetamide
N-benzyl-N-dodecyl-2,2-dichloroacetamide
N-cyclohexyl-N-3-methoxypropyl-2,2-dichloroacetamide
N(2-cyanoethyl)12,2-dibromo-p-nitroacetanilide
N(2,4,5-trichloro benzyl)-N-methyl-2,2-dichloroacetamide
N(phenethyl N-2-ethylhexyl)-2,2-dichloroacetamide
N-naphthyl-N-ethyl-2,2-dibromoacetamide
N(methylcyclohexyl)-2,2-dichloroacetanilide
N-ethyl-2,2-dichloroacetanilide
N,N-dimethyl-2,2-dibromoacetamide
N-cyclohexyl-N-allyl-2,2-dichloroacetamide
N-dodecyl-N-methyl-2-chloro-2-bromoacetamide
N-phenethyl-N-n-butyl-2,2-dichloroacetamide
N,N-dibenzyl-2,2-dichloroacetamide
N-cyanoethyl-N-p-chlorophenyl-2,2-dichloroacetamide
N,N-di(2-ethylhexyl)-2,2-dichloroacetamide
N-p-(n-propyl)benzyl-N-ethyl-2,2-dichloroacetamide
N-2,4-dichlorophenyl-N-methyl-2,2-dichloroacetamide
N,N-di(p-allylphenyl)-2,2-dichloroacetamide
N,N-di(3-methoxypropyl)-2,2-dibromoacetamide
N-(p-nitrobenzyl)-N-ethyl-2,2-dichloroacetamide
N-bromoethyl-N-cyclopentyl-2,2-dichloroacetamide
N-2-decynyl-N-methyl-2,2-dichloroacetamide
N,N-diphenyl-2,2-dichloroacetamide
N,N-dicyclopentyl-2,2-dichloroacetamide
N,N-diethyl-2,2-dichloroacetamide
N-methyl-2,2-dichloroacetanilide
N-ethyl-2,2-dibromoacetanilide
N,N-di-n-butyl-2,2-dichloroacetamide
N,N-diisoamyl-2,2-dichloroacetamide Suitable tertiary phosphines include Tri-n-butyl phosphine
Dimethyl propyl phosphine
Triphenyl phosphine
Di(dodecyl) methyl phosphine
Benzyl dicyclohexyl phosphine
p-Chlorophenyl dimethyl phosphine
Diethyl naphthyl phosphine
Methoxypropyl dimethyl phosphine
Ethyl methyl benzyl phosphine
Trimethyl phosphine
2,4-dichlorophenyl dimethyl phosphine
Tris(cyanoethyl) phosphine
n-(3-nitrobutyl) diethyl phosphine
Triethyl phosphine
Tribenzyl phosphine Tertiary phosphines with other combinations of the R radicals above defined will be similarly useful. A single mole of any of these tertiary phosphines will react on 2,2-dihaloamides and induce the formation of vinyl amines by the removal of the carbonyl oxygen atom and the translocation of a halogen atom from the 2 position to the 1 position. However, the reaction with a plurality of moles of the phosphorus compounds will form the subject compounds with two phosphonium substituents. Preferred practice involves the use of approximately three or even more moles of the phosphorus compounds whereby optimum yields of the desired compounds are obtained.

The procedure for effecting the reaction involves heating the mixed reagents at elevated temperatures, for example 50–150° C. A fluid medium is desirable and for higher molecular weight reactants it may be essential. This fluid medium is established by dissolving the reactants in an inert organic solvent, such as benzene, toluene, xylene, diethyl ether, ethylene dichloride, carbon tetrachloride and other hydrocarbons and chlorinated hydrocarbons. The reaction temperature may be the reflux temperature of the solvent medium chosen, which may be adjusted as required by increasing or reducing the pressures.

An inert atmosphere above the reaction mixture is frequently required for the production of optimum yields, and for this an atmosphere of nitrogen is convenient. The pressure of the inert atmosphere may also be used to manipulate the temperature within the reaction vessel.

The bis-phosphonium salts are generally solids, and the organic solvent in which they are prepared may be evaporated or used as a medium for crystallization. The solid products may be further purified by dissolving them in a suitable solvent. Chlorinated hydrocarbons, such as chloroform, carbon tetrachloride and ethylene dichloride; esters, such as ethyl acetate and ketones, such as methyl ethyl ketone or acetone, and other solvents which are inert may be used in the purification. The solutions so prepared are then cooled to precipitate the crystalline products.

Further details of the method of preparation of the new compounds are set forth in the following example.

EXAMPLE

A solution of a one molar proportion of N-methyl-2,2-dichloroacetanilide and a three molar proportion of tributyl phosphine was dissolved in benzene and heated at 125° C. for 2.5 hours. An atmosphere of nitrogen was maintained in the reaction vessel. The mixture was cooled and ethyl acetate was added. The mixture was warmed with stirring and then chilled. The precipitated product was separated by filtration and then recrystallized from a mixture of chloroform and ethyl acetate. The yellow crystalline product was identified as N-methyl anilinoethylene-1,2-bis(tributylphosphonium chloride).

Using the procedure set forth in the preceding example except that different amides described above are used in place of the N-methyl-2,2-dichloro acetanilide, a series of new and useful bis(phosphonium) halides is formed.

N-methyl anilinoethylene-1,2-bis(tri-n-butyl phosphonium chloride)
N-ethyl-N-butyl-aminoethylene-1,2-bis(dimethylpropyl phosphonium chloride)
N-benzyl-N-dodecyl-aminoethylene-1,2-bis(triphenyl phosphonium chloride)
N-cyclohexyl-N-3-methoxypropyl-aminoethylene-1,2-bis-(didodecyl methyl phosphonium chloride)
N-2-cyanoethylanilinoethylene-1,2-bis(dicyclohexyl benzyl phosphonium bromide)
N(2,4,5-trichlorobenzyl)-N-methyl-aminoethylene-1,2-bis-(methyl-p-chlorophenyl methyl phosphonium chloride)
N-phenethyl-N-2-ethylhexyl-aminoethylene-1,2-bis(naphthyl diethyl phosphonium chloride)
N-naphthyl-N-ethyl-aminoethylene-1,2-bis(methoxypropyl dimethyl phosphonium bromide)
N-methylcyclohexyl anilinoethylene-aminoethylene-1,2-bis(methyl ethyl benzyl phosphonium chloride)
N,N-diethylaminoethylene-1,2-bis(triphenyl phosphonium chloride)
N,N-diethylaminoethylene-1,2-bis(triethyl phosphonium chloride)
N-ethylanilinoethylene-1,2-bis(trimethyl phosphonium bromide)
N,N-diisoamyl aminoethylene-1,2-bis(tribenzyl phosphonium chloride)

Although the invention is described with respect to the above specific examples is not intended that the details thereof are limitations of the invention except to the extent incorporated in the following claims.

What is claimed is:
1. The method of preparing a compound of the structure

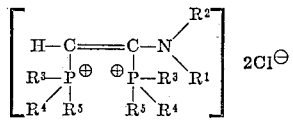

wherein the $R^1$, $R^2$, $R^3$, $R^4$ and $R^5$ are alkyl radicals of up to 12 carbon atoms, which comprises heating a mixture of an excess of a tertiary phosphine wherein the substituents are alkyl containing up to 12 carbon atoms, and an amide of the structure

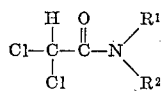

wherein $R^1$ and $R^2$ are alkyl radicals of up to 12 carbon atoms.

2. A compound of the structure

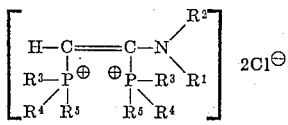

wherein the $R^1$, $R^2$, $R^3$, $R^4$ and $R^5$ are alkyl radicals of up to 12 carbon atoms.

3. A compound of the structure

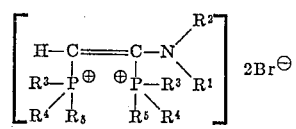

wherein $R^1$, $R^2$, $R^3$, $R^4$ and $R^5$ are alkyl radicals of up to 12 carbon atoms.

4. The method of preparing a compound of the structure

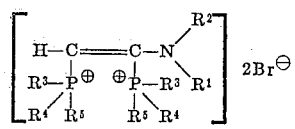

wherein $R^1$, $R^2$, $R^3$, $R^4$ and $R^5$ are alkyl radicals of up to 12 carbon atoms, which comprises heating a mixture of an excess of a tertiary phosphine wherein the substituents are alkyl containing up to 12 carbon atoms, and an amide of the structure

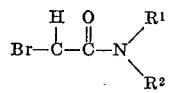

wherein $R^1$ and $R^2$ are alkyl radicals of up to 12 carbon atoms.

5. N-methylanilinoethylene - 1,2 - bis(tri-n-butyl phosphonium chloride).

6. The method of preparing N-methylanilinoethylene-1,2 - bis(tri-n-butyl phosphonium chloride) which comprises heating N-methyl - 2,2 - dichloroacetanilide in the presence of approximately three molar proportions of tri-n-butyl phosphine.

7. N,N-diethyl - 1,2 - bis(triphenyl phosphonium chloride).

8. The method of preparing N,N-diethyl-1,2-bis(triphenyl phosphonium chloride) which comprises heating N,N-diethyl-2,2-dichloroacetamide in the presence of approximately three molar proportions of triphenyl phosphine.

9. N,N-diethylaminoethylene-1,2-bis(triethyl phosphonium chloride).

10. The method of preparing N,N - diethylaminoethylene - 1,2 - bis(triethyl phosphonium chloride) which comprises heating N,N-diethyl-2,2-dichloroacetamide in the presence of approximately three molar portions of triethyl phosphine.

11. N-ethylanilinoethylene-1,2-bis(trimethyl phosphonium bromide).

12. The method of preparing N-ethylanilinoethylene-1,2-bis(trimethyl phosphonium bromide) which comprises heating N-ethyl-2,2-dibromoacetanilide in the presence of approximately three molar proportions of trimethyl phosphine.

13. N,N - diisoamyl aminoethylene - 1,2 - bis(tribenzyl phosphonium chloride).

14. The method of preparing N,N-diisoamyl aminoethylene-1,2-bis(tribenzyl phosphonium chloride) which comprises heating N,N - diisoamyl-2,2-dichloroacetamide in the presence of approximately three molar proportions of tribenzyl phosphine.

No references cited.

CHARLES B. PARKER, *Primary Examiner.*

JOSEPH P. BRUST, *Examiner.*